United States Patent [19]

Thalmann

[11] Patent Number: 4,536,644

[45] Date of Patent: Aug. 20, 1985

[54] ARRANGEMENT FOR WELDING TOGETHER THERMOPLASTIC MOLDED MEMBERS

[75] Inventor: Alfred Thalmann, Uhwiesen, Switzerland

[73] Assignee: Georg Fischer Aktiengesellschaft, Schaffhausen, Switzerland

[21] Appl. No.: 680,389

[22] Filed: Dec. 11, 1984

[30] Foreign Application Priority Data

Dec. 19, 1983 [CH] Switzerland .................. 6737/83

[51] Int. Cl.$^3$ .............................................. H05B 3/58
[52] U.S. Cl. ............................... 219/535; 156/174.2; 156/304; 156/379.1; 219/528; 219/541; 156/304.2; 219/544; 219/549; 264/230; 285/21
[58] Field of Search ............... 219/528, 535, 541, 544, 219/549, 551; 156/272, 274.2, 304.2, 379.7; 264/230, 27; 285/21

[56] References Cited

U.S. PATENT DOCUMENTS

| | | | |
|---|---|---|---|
| 4,313,053 | 1/1982 | Sturm | 219/544 |
| 4,362,684 | 12/1982 | Thalmann | 264/230 |
| 4,365,144 | 12/1982 | Reich et al. | 219/535 |
| 4,370,548 | 1/1983 | Nagasawa et al. | 219/549 |
| 4,436,987 | 3/1984 | Thalmann et al. | 219/535 |
| 4,449,038 | 5/1984 | Reich et al. | 219/535 |
| 4,455,482 | 6/1984 | Grandclement | 219/551 |

Primary Examiner—Volodymyr Y. Mayewsky
Attorney, Agent, or Firm—Toren, McGeady, Stanger, Goldberg & Kiel

[57] ABSTRACT

An arrangement for welding together molded members consisting essentially of thermoplastic materials having abutting surfaces which extend generally parallel to each other at which a welding connection is made by electrical heat conductors located at the abutting surfaces. The electrical heat conductors are electrically activated to effect a welding operation and at least a plurality of the electrical heat conductors are connected in parallel with each other and are located between the abutting surfaces at which the weld is to be formed.

6 Claims, 5 Drawing Figures

ARRANGEMENT FOR WELDING TOGETHER THERMOPLASTIC MOLDED MEMBERS

The present invention relates generally to welding together of thermoplastic molded members and more particularly to an arrangement utilizing electrical heat conductors for effecting a welding connection between the molded members.

In devices of the type to which the present invention relates, the members which are to be welded together have abutting surfaces which extend parallel to each other and which are located to have a welding connection formed therebetween by the electrical heat conductors. In the prior art, there is disclosed an arrangement for joining together a pipe member and a sleeve made of thermoplastic material wherein heating wire windings are arranged between circumferential connecting surfaces. Such an arrangement is known, for example, from DE-AS 1048106. The connecting ends of the heating wire windings through which the current supply is effected protrude to a side of the sleeve for enabling access thereto and a bifilar winding of the heating wire is required in this arrangement. However, in this arrangement, there exists the danger that, in the case of contact between two adjacent windings, the effective length of the heat conductor will be materially shortened, thereby diminishing the resistance and causing defective welds to be formed.

It has been attempted to overcome such disadvantages by the application of an insulation layer which is not subject to melting, such as, for example, an oxidation layer and this is suggested in CH-A1-400687. Therefore, in such an arrangement of a bifilar winding, there is required a heat conductor which is provided with an insulation layer capable of providing good heat resistance and which also is only capable of being utilized for the cited pipe sleeve connection.

In order to join together saddle pieces or other molded members having two halves with pipes, it is known from DE-B1-2242369 to arrange one piece heating conductors constructed as heating mats between the pipe and the molded member. Because of the gap which is thereby formed between the end of the mats, a completed welding connection along the entire pipe circumference cannot be assured.

The heating mat arrangement shown in the prior art in EP-A1-0076460 constitutes an attempt to overcome such a disadvantage, but an arrangement of heating mats of this type can only be advantageously used for the type of application shown in the aforecited prior art publication.

Accordingly, the present invention is directed toward providing an arrangement for the welding of molded members of the type previously discussed wherein the disadvantages mentioned above involved in the state of the art techniques can be avoided and wherein two or more different molded members, for example, housing halves having randomly shaped, peripheral abutting surfaces, can be joined together by a dense and tight welding connection. In the case where a sleeve-to-pipe connection is to be made, a one-sided leadout of the electrical connection is enabled without the disadvantages inherent in bifilar windings of the heating conductor.

SUMMARY OF THE INVENTION

Briefly, the present invention may be described as an arrangement for welding together molded members which consist essentially of thermoplastic material by providing, in the molded members along generally parallel abutting surfaces thereof at which a welding connection is to be formed, electrical heat conductors which are located at the abutting surfaces and which are adapted to be electrically activated to effect the welding operation, with the electrical heat conductors being provided so that at least a plurality of said electrical heat conductors are connected in parallel with each other and are located between the abutting surfaces.

By providing an arrangement of at least two electrical heating conductors arranged switched parallel with each other between the abutting surfaces of the molded members, it is possible to weld the members together with randomly shaped, peripheral abutting surfaces in a compact and tight manner while avoiding flawed welds which would result through metallic contact of two adjacent windings. In such an arrangement, the energy supply and distribution is not changed by such lateral short circuits. In such a setup, current connections which are separated spacewise are arranged opposite each other so that no real short-circuited connection may occur.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
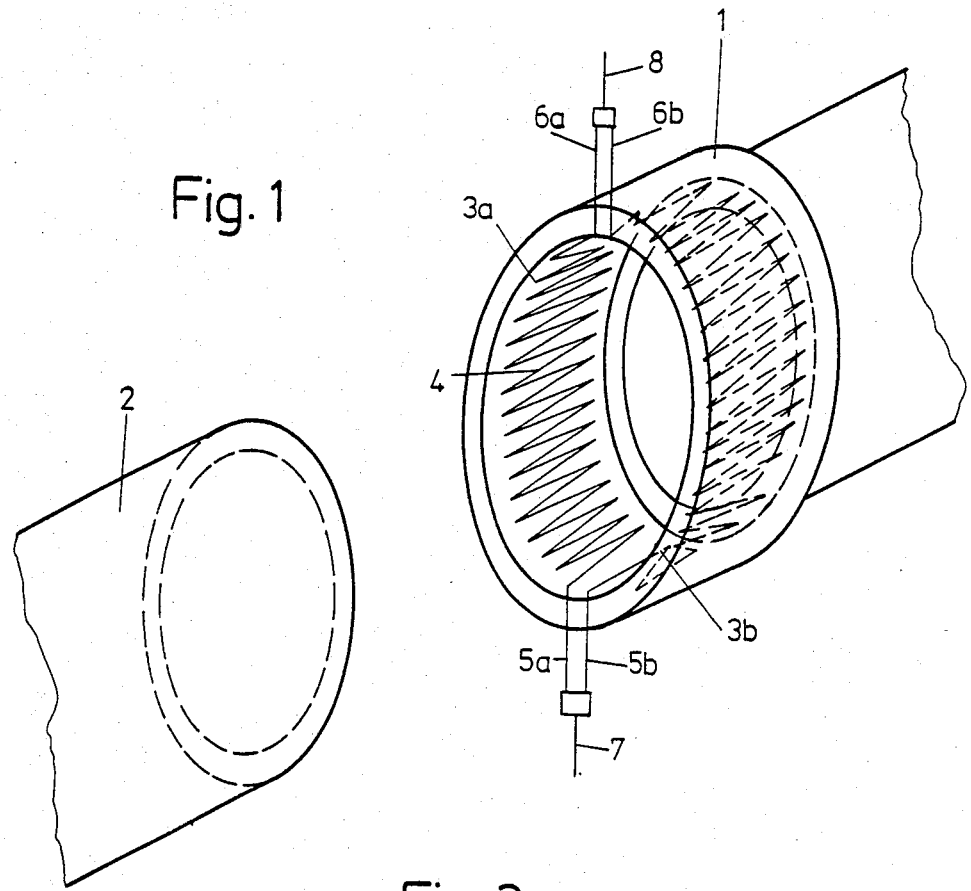
FIG. 1 is a perspective view of a setup for welding together of one pipe end with a sleeve, the arrangement being shown prior to the weld assembly being formed.

Referring now to FIG. 1, there is shown therein a setup wherein the present invention may be utilized for joining together a sleeve 1 and a pipe member 2, both of which consist of thermoplastic synthetic material. A pair of electrical heating conductors 3a, 3b are arranged at the inner periphery of the sleeve 1 and they have windings 4 which are disposed circumferentially around the inner periphery of the sleeve 1 and which are also formed with axially extending components.

Each of the heating conductors 3a, 3b is arranged in the area of half of the inner circumference of the surface of the sleeve 1, respectively, and extends to cover half of the inner area of the circumferential inner surface.

The conductors 3a and 3b are each formed with two ends, with the heating conductor 3a having ends 5a, 6a and with the heating conductor 3b having ends 5b, 6b. The two ends 5a, 6a of the heating conductor 3a lie adjacent, respectively, to the ends 5b, 6b of the heating conductor 3b and are incorporated one each into a current connection 7 and 8 located at peripherally opposite points.

Figure 2:
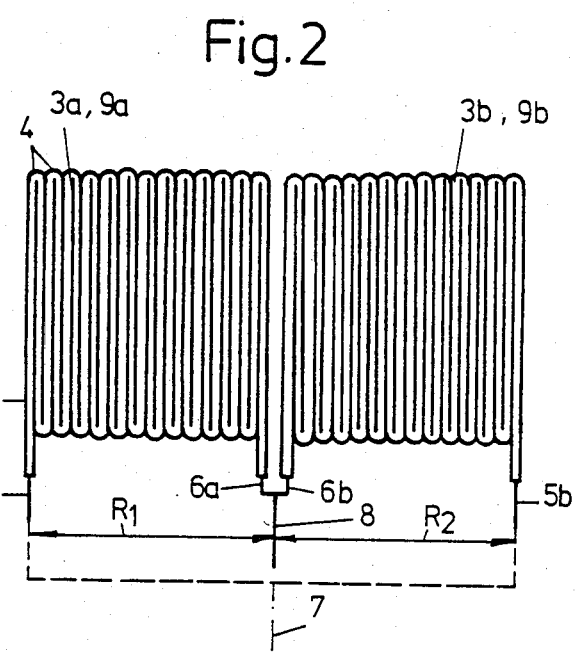
FIG. 2 is a plan view of the heating conductors used in the welding arrangement shown in a flattened state and adapted to be utilized in a setup such as that shown in FIG. 1.

The heating conductors 3a and 3b shown in FIG. 1 are depicted in FIG. 2 as arranged in a flattened state whereby each of the conductor elements 3a and 3b are arranged to form, respectively, a heating mat 9a, 9b by arrangement of the conductors 3a, 3b in a zigzag pattern. In the arrangement depicted in FIG. 2, the heating conductors 3a, 3b are each coated with a thermoplastic synthetic material so that adjacent windings of the heating conductors 3a and 3b are electrically separated from each other by means of insulation 10. However, should two adjacent heat conductors come into contact with each other, during the welding process despite the provision of the insulation 10, short-circuiting will occur at most over one winding whereby the overall electrical resistance will be changed only by a small amount. Thus, it will be seen that in the case described there is provided an arrangement which is different from that involving a bifilar winding wherein there will occur no influence worth mentioning on the quality of the welding connection. As a result of the connection described of the ends of the heating conductors 3a, 3b, a parallel circuit of the heating resistances $R_1$ and $R_2$ is formed wherein the electrical resistances are individually equal or nearly equal.

Figure 3:
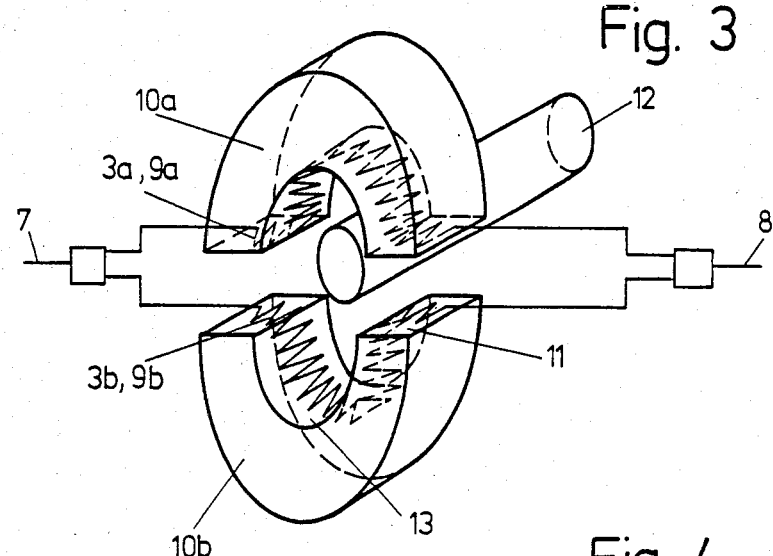
FIG. 3 is a perspective view of a setup for welding of shell-shaped moldings together with a part to be inserted therein.

FIG. 3 shows an arrangement wherein a pair of semitoroidal members 10a and 10b may be joined together and with a tubular member 12 which is shaped in the form of a pipe, rod or cable and which may be inserted between the semitoroidal members 10a and 10b. A welding operation may be performed by means of the two electrical heating conductors 3a and 3b. The conductors 3a and 3b which are designed as heating mats 9a and 9b are also switched in parallel whereby each heating mat 9a, 9b respectively in each case covers the flat abutting surfaces 11 and the inner circumferential surfaces 13 of each of the semitoroidal molded parts 10a, 10b.

During assembly and welding, the two heating mats 9a and 9b will come to lie one above the other in the area of the abutting surfaces 11 which is possible, however, as a result of their being connected in parallel. The part 12 and, thus, the inner peripheral surface 13 may also have other cross-sectional configurations which differ from a circular configuration shown in FIG. 3 whereby the part 12 may be designed, for example, with a multicornered or oval cross-section.

Figure 4:
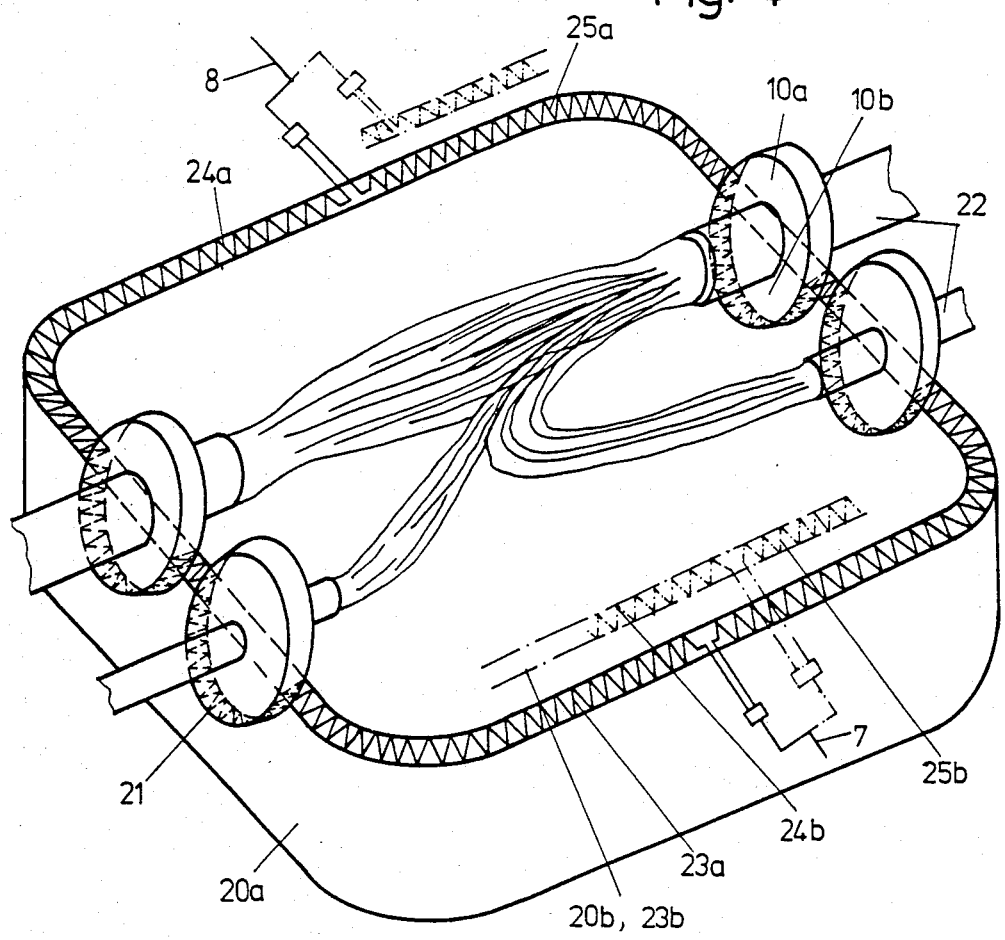
FIG. 4 is a perspective view of a setup for welding together of molded housing parts with cables or cable conduit connections for multiple cable joints.

FIG. 4 shows a different setup representing a further embodiment of the invention wherein a pair of molded housing members 20a and 20b may be welded together with the housing member 20b being only partially shown in outline in FIG. 4. The housing members are formed with recesses and, for example, as indicated in FIG. 4, the molded housing member 20a comprises semitoroidal recesses 21 within which the molded semitoroidal members 10a or 10b may be fitted. With the molded housing members 20a and 20b joined together, multiple connections or branches of, for example, telephone cables may be arranged in the housing so as to be securely covered. An example is shown in FIG. 4 wherein the cables 22 having differing diameters are at first equipped with a pair of semitoroidal molded members 10a, 10b by a welding assembly procedure, such as that described in connection with FIG. 3 with the devices then being fitted into the recesses 21 of the molded housing members 20a and 20b. The cables may also be joined with the housings in case they repose directly in the recesses.

Two heat conductors 24a and 25a are positioned onto peripheral abutment surfaces 23a of the molded housing member 20a. Heating conductors 24b and 25b are positioned onto abutting surfaces 23b of the molded housing member 20b. Thus, by a respective combination of the heat conductor ends in each case into one current connection 7 and 8, all four heat conductors are connected in parallel with each other. In this setup, when the two housing halves 20a and 20b are mated, respectively, two heating conductors 24a and 24b or 25a and 25b will lie directly above each other between the flat portions of the abutting surfaces 23a and 23b. Between the abutting faces of the recesses 21 and the semitoroidal members 10a and 10b, there occurs, respectively, only one heat conductor 24a or 24b or 25a or 25b.

The individual electrical resistances of the four heat conductors connected parallel with each other should also be equal or approximately equal and thus are $R_1 \simeq R_2 \simeq R_3 \simeq R_4$.

As has been described in connection with FIG. 2, the heat conductors may be designed as heating wires, as heating mats or also as heating tapes. The heat conductor can also be fabricated from sheet metal or from a foil, for example, a copper alloy, where the heat conductor is stamped from sheet metal in accordance with the shape and dimensions of the abutting surfaces of the molded parts.

Figure 5:
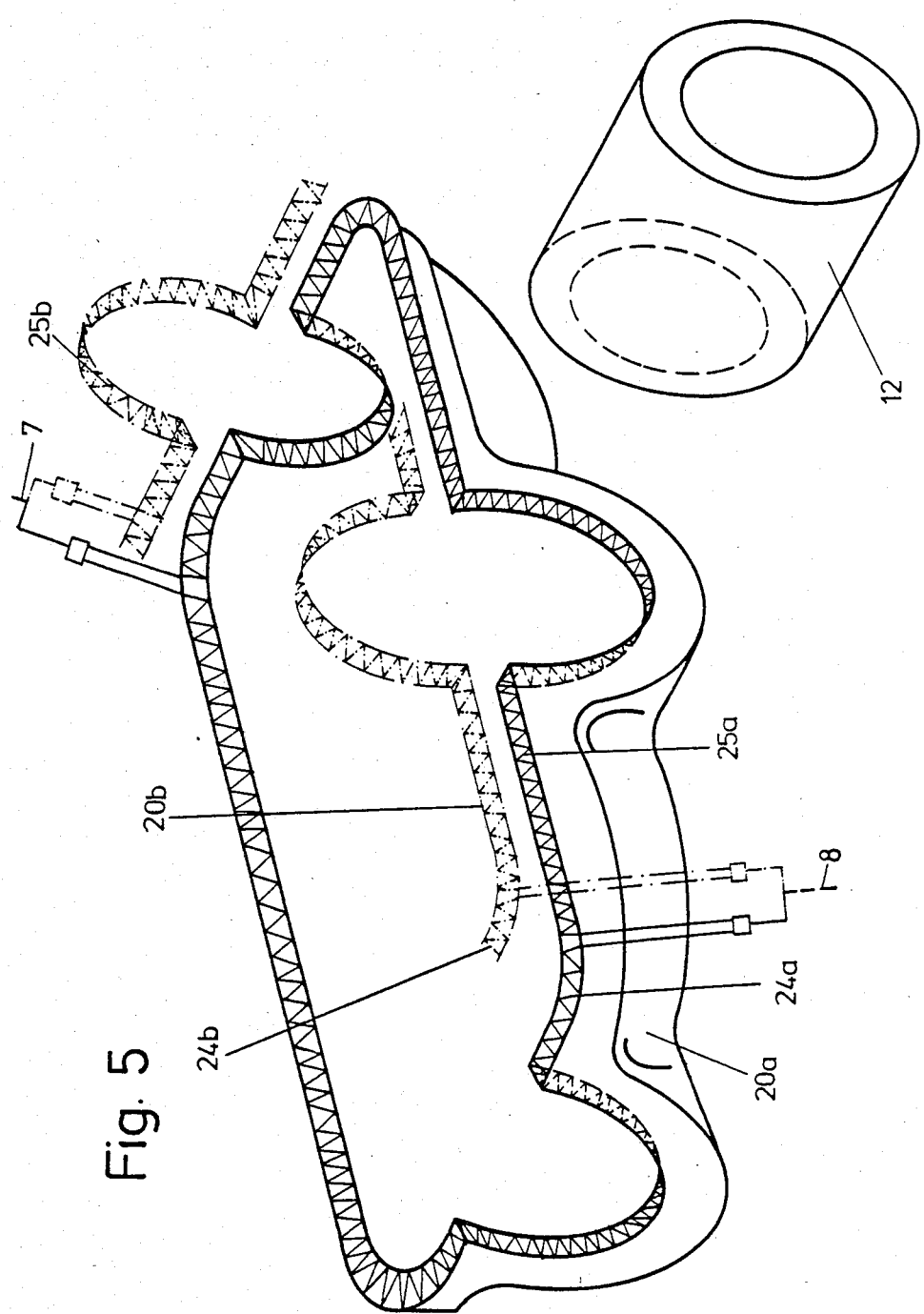
FIG. 5 is a perspective view of a variation of the setup of FIG. 4.

FIG. 5 shows a further embodiment of the invention which constitutes a modification of the embodiment shown in FIG. 4. In FIG. 5, the two molded housing parts 20a and 20b are constructed as T-shaped housing halves joined with each other and with three tubular parts 12 directly by one welding process. The arrangement of the four heat conductors 24a, 25b, 24b and 25b connected parallel with each corresponds to the arrangement described in relation to FIG. 4.

Thus, in accordance with the present invention, it will be seen that the invention operates to enable welding of two molded parts, such as the parts 10a and 10b with each other and with another part, such as the tubular part 12 which may be inserted between the two parts 10a and 10b with heat conductors 3a and 3b which are connected parallel with each and which are designed as heating mats 9a and 9b being introduced between the abutting surfaces 11, 13 of the parts 10a, 10b, 12. The electrical resistance of both the heat conductors 3a and 3b is equal or approximately equal and the current connections 7, 8 are arranged spacewise so as to be opposite to each other.

While specific embodiments of the invention have been shown and described in detail to illustrate the application of the inventive principles, it will be understood that the invention may be embodied otherwise without departing from such principles.

What is claimed is:

1. In an arrangement for welding together molded members consisting essentially of thermoplastic material, said molded members being shaped to define abutting surfaces extending generally parallel to each other at which a welding connection is made by means of electrical heat conductors located at said abutting surfaces, said heat conductors being adapted to be electrically activated to effect a welding operation, the improvement comprising that at least a plurality of said electrical heat conductors are connected in parallel with each other and are located between said abutting surfaces.

2. An arrangement according to claim 1, wherein said heat conductors connected in parallel with each other have at least approximately equivalent electrical resistances.

3. An arrangement according to claim 1, wherein said heat conductors comprise a resistance wire coated with thermoplastic synthetic material which forms said conductors in the shape of a heating mat in a pattern of windings.

4. An arrangement according to claim 1, wherein said heat conductors are designed as a heating tape.

5. An arrangement according to claim 1, wherein one of said molded members comprises a pipe member and the other of said molded members comprises a sleeve, said molded members being adapted to be joined together to enable a medium to flow therethrough on the interior thereof with each of said members having peripheral surfaces along which said welding is to be formed, said electrical heat conductors comprising a pair of heat conductors connected in parallel and arranged at said peripheral surfaces of said members to be joined together, each of said heat conductors covering half of the periphery of the surfaces which are to be joined together, said arrangement further comprising current supply connectors joining said heat conductors at their ends, said connectors being located on that side of said sleeve member which does not come into contact with the medium flowing therethrough.

6. An arrangement according to claim 1, wherein said molded members comprise a first and a second molded member each having recesses formed therein and at least one other molded member adapted to be inserted into said recesses with at least one of said electrical heat conductors being arranged for each of said molding members between the abutting surfaces thereof wherein between the abutting surfaces of said first and said second molded members and said at least one other molded member one heating conductor is located and between the abutting surfaces of said first and said second molded members two heated conductors are arranged one above the other.

* * * * *